Nov. 26, 1968 H. R. ANDERSON, JR., ET AL 3,413,146

THERMOPLASTIC RECORDING MEDIUM

Filed Sept. 2, 1964 3 Sheets-Sheet 1

CHARGING
STEP 1

CHARGING
STEP 2

HEAT-DEVELOPMENT
STEP 3

INVENTORS
HERBERT R. ANDERSON, JR.
PHILIP LEVINE
BY [signature]
ATTORNEY

BEFORE CHARGING
STEP 1

AFTER CHARGING
STEP 2

HEAT DEVELOPMENT
STEP 3

United States Patent Office 3,413,146
Patented Nov. 26, 1968

3,413,146
THERMOPLASTIC RECORDING MEDIUM

Herbert R. Anderson, Jr., Pound Ridge, and Philip Levine, Scarsdale, N.Y., assignors to International Business Machines Corporation, New York, N.Y., a corporation of New York Filed Sept. 2, 1964, Ser. No. 393,902
18 Claims. (Cl. 117—211)

ABSTRACT OF THE DISCLOSURE

Copolymers consisting of substituted and unsubstituted styrene with a methacrylate or methacrylates having the formula $$CH_2{=}\overset{\displaystyle CH_3}{\overset{|}{C}}{-}COOR_1$$

(where $R_1$ is selected from an alkyl radical having from 1 to 22 carbon atoms, or a phenoxyalkyl radical having from 7 to 22 carbon atoms) are prepared and used as thermoplastic recording media. The methacrylate portion of the copolymer constitutes 18 to 35 mol percent of the total copolymer composition. The copolymers prepared have a number average molecular weight in the range of 2500 to 6500. These copolymer materials are responsive to electrostatic forces when heated and exhibit superior reversibility by reason of their resistance to radiation and thermal degradation.

This invention relates to polymeric compositions which are responsive to electrostatic forces and which have the added feature of superior reversibility. More particularly, it relates to copolymers of substituted and unsubstituted styrene and a methacrylate or methacrylates having the formula $$CH_2{=}\overset{\displaystyle CH_3}{\overset{|}{C}}{-}COOR_1$$

(where $R_1$ is selected from the group consisting of an alkyl radical having from 1 to 22 carbon atoms, an arylalkyl radical having from 7 to 22 carbon atoms, and a phenoxyalkyl radical having from 7 to 22 carbon atoms), the methacrylate portion constituting 18–35 mole percent of the total polymer.

It is the usual practice in thermoplastic recording to apply a localized electrostatic charge to a thermoplastic medium either by such means as an electron beam or a corona discharge. Surface deformations can be achieved by heating the composite article or recording medium, particularly the surface thereof, with, for instance, direct application of heat or by heat generated by radio frequency energy acting on a conducting layer, whereby the heat causes only the top thermoplastic negatively charged layer to fuse or melt, and become liquid. When this happens, opposite charges attract to deform the surface of the thermoplastic upper layer into various depressions, hills, ridges, etc. Thereafter, the heated surface is cooled or allowed to cool immediately to set or solidify these hills, ridges, and other deformations in the thermoplastic layer. The recording medium thus treated can now be read or projected visually by passing a beam of light through it in cooperation with a special optical system for conversion into an image, or can be optically converted to the desired information or data in the form of electrical signals. The image can be viewed directly, projected on a screen, transmitted electronically for viewing on a television screen elsewhere, or can be simply stored on film. An additional description of the method for recording in the manner described above can be found in an article by William E. Glenn, Jr., in "Journal of Applied Physics," December 1959, pages 1870–1873. In addition, the elements of in-air recording using thermoplastics is described by H. G. Grieg, "An Organic Photoconductive System," RCA Review, vol. XXIII, page 413, September 1962.

Because the thermoplastic layer is capable of being heated to the liquid state (at which time it develops the surface deformations by action of the induced electric field on a charged portion of the liquid, and the pattern or ripples thus produced is frozen into a permanent record by promptly cooling the liquid thermoplastic layer to the solid state), it is possible to employ such recording material many times over by merely subjecting the surface layer to the action of heat at a temperature high enough to smooth the upper layer by fusion thus "erasing" the information stored in the aforesaid thermoplastic layer.

In the ordinary practice of placing information on thermoplastics, the material is necessarily exposed to ionizing radiation and high temperatures. Both of these tend to degrade the polymer and alter its response characteristics. It is desirable in many applications in thermoplastic recording to have a material which is capable of undergoing a large number of write-develop-erase cycles in order to update information, or memories, or project new images. The cumulative effect of polymer degradation during write-develop-erase cycling serves to determine the limit of reversibility. Excessive amounts of degradation should, therefore, be avoided.

It has been found contrary to the results previously obtained (note U.S. Patent 3,118,786 of Katchman et al.), that materials which constitute copolymers of styrene and various methacrylates, when the methacrylate is present in the proportion of 18–35 mole percent are eminently suited for use as media for thermoplastic recording. In addition to having the desired physical properties, these copolymers have been found to have superior resistance to radiation and thermal degradation so that they undergo a large number of write-develop-erase cycles without appreciable deterioration.

An object of the invention is to prepare a polymeric composition which can be used as a thermoplastic layer for recording, storing and reproducing photographic images, technical data, etc.

Another object of the invention is to prepare polymeric recording media in which the thermoplastic layer of such media is deformable upon application of an electrostatic charge.

Still another object is to prepare a thermoplastic polymeric recording medium with improved reversibility capabilities comprising a copolymer of styrene or substituted styrenes singly or in combination with a methacrylate or methacrylates.

A further object of the invention is to prepare a thermoplastic recording medium exhibiting superior reversibility which comprises a copolymer of styrene or substituted styrenes singly or in combination with a methacrylate having the formula $$CH_2{=}\overset{\displaystyle CH_3}{\overset{|}{C}}{-}COOR$$

(where R is selected from the group consisting of an alkyl radical having from 1 to 22 carbon atoms, an arylalkyl radical having 7 to 22 carbon atoms, and a phenoxyalkyl radical having from 7 to 22 carbon atoms), the methacrylate portion constituting 18–35 mole percent of the total polymer.

The foregoing and other objects, features, and advantages of this invention will be apparent from the following more particular description of the preferred embodiments of the invention, illustrated in the accompanying drawings, in which, FIGURE 1 is a diagrammatic illustration of an in-air technique used to deform a thermoplastic recording material.

Figure 4A:
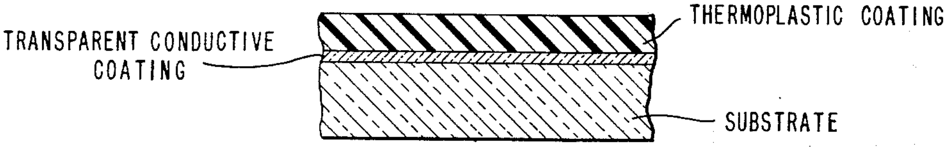
FIGURE 4 is a diagrammatic illustration of the process used to achieve surface deformations on a thermoplastic material.

FIGURE 4A, B, and C depict the sequence of steps used to get deformations on the surface of the thermoplastic layer.

FIGURE 4A shows the glass substrate on which the thermoplastic is coated.

Figure 4B:
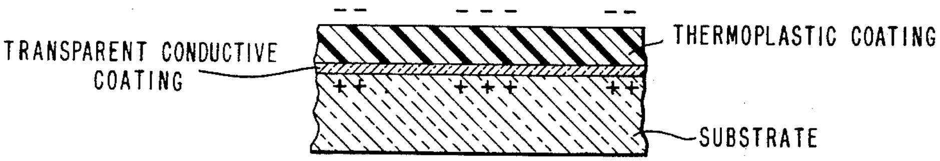

FIGURE 4B shows the localized electrostatic charges deposited on the thermoplastic coating by an electron beam.

Figure 4C:
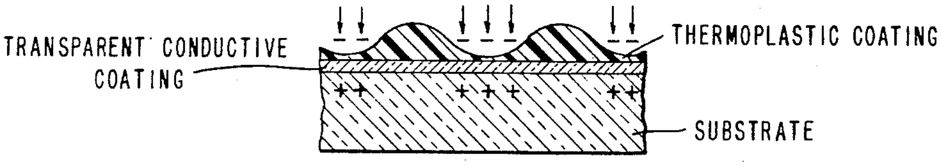

FIGURE 4C shows the developed thermoplastic image resulting from heating and cooling the charged coating of FIGURE 4B.

In order for the recording medium to be suitably responsive, the electrical resistivity of the material comprising the medium can be in the range from $10^7$ to $10^{17}$ ohm centimeter (preferably, for practical reasons, the resistivity should be $10^{13}$ ohm centimeters). In writing on thermoplastics, the initial electrostatic force decays exponentially as the temperature is raised during the development step. At the same time the viscosity of the medium decreases exponentially with temperature. Thus, during the development step a point is reached at which the residual electrostatic force is capable of overcoming the opposing viscous forces to deform the surface. It has been found experimentally that the temperature at which deformation takes place in the thermoplastic recording is somewhat higher (e.g. 10°–80° C.) than the glass transition temperature, which is the temperature at which the glassy material becomes soft.

Since the response characteristics of a thermoplastic recording material are governed by its physical and electrical properties, one is able to optimize its response in recording by concomitant adjustment of the glass transition temperature, molecular weight, and degree of plasticization. However, for extended reversibility the chemistry of polymer must be arranged to minimize degradation due to radiation and thermal exposure. Thus, the chemistry of the polymer becomes specified by the desired radiation and thermal resistance. With the chemistry of the material thus specified, by adjusting the molecular weight and/or the molecular weight distribution a material can be made which will respond upon application of electrostatic charge.

One of the constituents of the thermoplastic copolymer composition may be selected from substituted or unsubstituted styrene having the formula

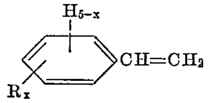

where R is selected from the class consisting of hydrogen, methoxy, and methyl radicals, and $x$ is a whole number equal to from 0 to 2; and the other constituent is a methacrylate or a combination of methacrylates having the formula $$CH_2{=}\overset{\displaystyle CH_3}{\overset{|}{C}}{-}\underset{\underset{\displaystyle O}{\|}}{C}{-}O{-}R_1$$

where $R_1$ is selected from the group consisting of an alkyl radical having from 1 to 22 carbon atoms, an arylalkyl radical having from 7 to 22 carbon atoms and a phenoxyalkyl radical having from 7 to 22 carbon atoms.

Exemplary of the $R_1$ alkyl radicals are methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, and the various positional isomers thereof, such as iso-propyl, iso-butyl, t-butyl, sec-butyl, iso-amyl, t-amyl, iso-hexyl, iso-octyl, 2-ethylhexyl, t-octyl, t-decyl, t-pentadecyl, t-nonadecyl, and t-dodecyl.

Exemplary of the arylalkyl radicals are: benzyl, 1-phenylethyl, 2-phenylethyl, 1-phenylpropyl, 2-phenylpropyl, 3-phenylpropyl, 1-phenylbutyl, 2-phenylbutyl, 3-phenylbutyl, 4-phenylbutyl, 2-(o-, m-, or p-tolyl)-ethyl, 2-(o-, m-, or p-butylphenyl)-ethyl, 10-(o- m-, or p-butylphenyl)-decyl, 4-phenyldodecyl, 6-phenyl-2-ethylhexyl, 16-phenylhexadecyl, and 16-(o-, m-, or p-nitrophenyl)-hexadecyl.

Exemplary of the phenoxyalkyl and substituted phenoxyalkyl radicals are: phenoxymethyl, 2-phenoxyethyl, 2-phenoxypropyl, 3-phenoxypropyl, 4-phenoxybutyl, 4-phenoxyoctyl, 8-phenoxyoctyl, 12-phenoxydodecyl, 15-phenoxypentadecyl, 16-phenoxyhexadecyl, 10-[p-(n-butyl) - phenoxy] - decyl, 10 - [p - (2 - butyl) - phenoxy]-decyl, 16 - (p - nitrophenoxy) - hexadecyl, 16 - phenoxyhexadecyl, and 2-phenoxyhexadecyl.

Preferably, a material should be selected which has the electrical resistivity previously quoted and a glass transition temperature higher than room temperature. It has been found that in the majority of cases that copolymerization techniques could be employed to produce internally plasticized polymers which avoided problems in compatibility and vapor pressure.

It has been found in this invention that suitably responsive compositions can be made by combining substituted and unsubstituted styrenes with various methacrylates, singly or in combination such that the methacrylate is present in the range of 18–35 mole percent of the total copolymer. In order to maintain a given temperature of deformation and produce a desired resistance to cold flow, the proportion of the various methacrylates in these copolymers will vary due to the differing impact of these entities on the glass transition or deformation temperature. Generally, the lower the glass transition temperature of the methacrylate homopolymer, the smaller the amount necessary to provide the required response characteristics. The proportions of the materials in the copolymer are critical since it is necessary to maintain concomitantly the response characteristics and a chemistry which resists radiation and thermal degradation.

Careful attention to the considerations concerning the composition of the copolymers leads to the use of the aforesaid compositions in making composite articles, for instance, tapes, sheets, slides, disks, etc., suitable for recording, storing and reproducing photographic images and technical data, employing the above compositions of matter as the thermoplastic layer in which such images and data are recorded, stored, and reproduced.

The aforementioned copolymer compositions have proved to be superior in response and reversibility when the composition is properly adjusted. It is apparent to those skilled in the art that any of the compositions in the range cited may have its response characteristics altered by the incorporation of compatible plasticizers having low vapor pressures. These plasticizers may be incorporated into the polymer matrix in the range 5–100 parts by weight per hundred parts of polymer. Examples of such plasticizers are shown in Table I.

TABLE I.—PLASTICIZERS

Abietates:
- Methyl abietate
- Hydrogenated methyl abietate

Adipates:
- di-(n-hexyl)adipate
- dicapryl adipate
- diisooctyl adipate
- dinonyl adipate
- di-(butoxyethyl) adipate
- dicyclohexyl adipate Azelates:
- di(2-ethylhexyl)4-thioazelate
- diisobutyl azelate Citrates:
- tributyl citrate Glycol and polyol esters:
- diethylene glycol dibenzoate
- dipropylene glycol dibenzoate
- glycerol triacetate
- glycerol triproprionate
- triethylene glycol diacetate
- triethylene glycol dipropionate
- triethylene glycol di-2-ethylbutyrate
- triethylene glycol di-2-ethylhexoate
- polyethylene glycol di-2-ethylhexoate Glycolates:
- methyl phthalyl ethyl glycolate
- ethyl phthalyl ethyl glycolate
- butyl phthalyl butyl glycolate Phosphates:
- triethyl phosphate
- tributyl phosphate
- tri-(butoxyethyl) phosphate
- triphenyl phosphate
- tricresyl phosphate
- monophenyl-di-xenyl phosphate
- diphenyl mono-xenyl phosphate
- di-(t-butylphenyl) mono-(t-butylcresyl) phosphate Phthalates:
- dimethyl phthalate
- diethyl phthalate
- dibutyl phthalate
- diamyl phthalate
- dihexyl phthalate
- di-(methylisobutylcarbonyl) phthalate
- butyl octyl phthalate
- butyl isohexyl phthalate
- di-(n-octyl) phthalate
- diisooctyl phthalate
- di-(2-ethylhexyl) phthalate
- n-octyl-n-decyl phthalate
- dicyclohexyl phthalate
- butyl cyclohexyl phthalate
- di-(methoxyethyl) phthalate
- di-(ethoxyethyl) phthalate
- di-(butoxyethyl) phthalate
- methylcyclohexyl isobutyl phthalate
- dibenzyl phthalate
- diphenyl phthalate
- butyl benzyl phthalate
- 2-ethylhexyl benzyl phthalate
- hexamethylene bis(2-ethylhexyl phthalate)
- diisodecyl 4, 5-epoxytetrahydrophthalate Sebacates:
- dimethyl sebacate
- dibutyl sebacate
- dioctyl sebacate
- diisooctyl sebacate
- di-(2-ethylhexyl) isosebacate
- dibutyl isosebacate
- butyl benzyl sebacate
- dibenzyl sebacate Sulfonates and sulfonamides:
- ethyl p-toluenesulfonate
- o-cresyl p-toluenesulfonate
- p-toluenesulfonamide
- cyclohexyl p-toluenesulfonamide Miscellaneous:
- o-terphenyl
- tetrahydrofurfuryl oleate
- chlorinated paraffin
- benzyl benzoate
- ethyl acetanilide
- triphenyl guanidine
- diphenyl ether
- methyl pentachlorostearate
- camphor
- dibutyl tartrate The backing material for the recording medium may be either a flexible composition or may be a rigid inflexible material. Examples of rigid materials which can be employed (keeping in mind that optical clarity, heat resistance, and radiation resistance, and radiation resistance are usually the required properties) are, for instance, glass (in the form of plates, slides, disks, etc.); unsaturated polyester resins (formed from the reaction of a polyhydric alcohol, such as ethylene glycol, diethylene glycol, propylene glycol, dipropylene glycol, etc., and an alpha-unsaturated alpha-beta-dicarboxylic acid or anhydride, for instance, maleic acid, maleic anhydride, fumaric acid, citraconic acid, etc.); combined with these unsaturated polyesters one may also incorporate such copolymerizable cross-linking ingredients, such as diallyl phthalate, diethylene glycol dimethacrylate, etc. One can also employ metals such as aluminum, nickel chromium, etc., where the metal serves both as a conducting layer and as a reflective surface which can be read optically by reflection.

Examples of flexible materials which can be employed advantageously as the backing material are, for instance, polyethylene terephthalate (which can be obtained by the transesterification of esters of terephthalic acid with divalent alcohols, for example, ethylene glycol as shown in U.S. Patent 2,641,592—Hofrichter), such polyethylene terephthalate being sold by E. I. du Pont de Nemours and Company of Wilmington, Del., under the name of Mylar. A more refined grade of polyester terephthalic acid tape or film found high appropriate as the basis for recording images (which contains small intercondensed residues from dihydric alcohols, such as, propylene glycol-1,3 to reduce crystallinity) is sold under the name of "Cronar."

Other backing materials which can be used advantageously because of their good heat resistance, strength, inertness, and resistance to radiation are polycarbonate resins.

It will be apparent to those skilled in the art that other compositions may be employed as backing materials where the softening point is sufficiently high so as to allow heating of the thermoplastic layer without adversely affecting the base layer.

In many instances, there is interposed between the thermoplastic surface and the backing, a conducting layer which can be subjected to radio frequency energy as a means for heating the thermoplastic layer. This conducting layer acts as the layer which becomes charged beneath the thermoplastic layer, and when the thermoplastic layer is heated to cause the thermoplastic material to become fluid and deformable, the deposits of opposite charges on the top of the thermoplastic layer are attracted to the charged conducting layer, thus deforming the thermoplastic surface of the film. Among such conducting layers (which should be thin enough to be optically clear if interposed between the base and the thermoplastic layer) may be mentioned the various metals, for instance, iron, chromium, tin, nickel, etc.; metallic oxides, such as stannic oxide, cuprous oxide, etc.; salts, for instance, cuprous iodide, etc. In using the conducting layer, it is essential that the layer of metal or metal compound applied to the base layer be no thicker than is required to obtain a transparent film. The metal film is advantageously of the order of about 10 to 100 angstroms (A.) or 0.0001 to 0.01 microns thick, and that it should have a resistivity of between 1,000 and 10,000 ohms per square centimeter for optimum radio frequency heating, if that is the method used for developing the deformation pattern.

The thickness of the thermoplastic layer can vary widely but advantageously is approximately 5 to 40 microns thick. The base layer thickness can also vary widely as long as it has the proper electrical and radiation resistance, flexibility, strength, heat resistance, etc.; this base layer can be from a few microns in thickness to as much as 50 to 400 microns or more in thickness.

The conducting layer is advantageously applied to the backing by the well-known method of volatilizing the metal or metal compound in a vacuum at elevated temperatures and passing the backing in proximity to the vapor of the metal or metal compounds so as to deposit an even thin, optically clear, adherent film of the metal or metal compound on the backing, preferably while the entire assembly is still under vacuum. One method for applying a metal salt conducting layer to the backing, e.g., polyethylene terephthalate, is found in U.S. Patent 2,756,165—Lyon. Thereafter, a solution of the thermoplastic composition is applied to the surface of the conducting layer, and the solvent evaporated to deposit a thin film of the thermoplastic composition on the conducting layer.

The particular solvents employed for the thermoplastic composition may be varied widely and will depend on the type of polymers and resinous compositions employed in the mixture of ingredients. Included among such solvents are aromatic hydrocarbon solvents, e.g., toluene, xylene, benzene, etc. Solids weight concentration of from 10 to 50 percent of the thermoplastic composition in the solvent are advantageously used.

Figure 1A:
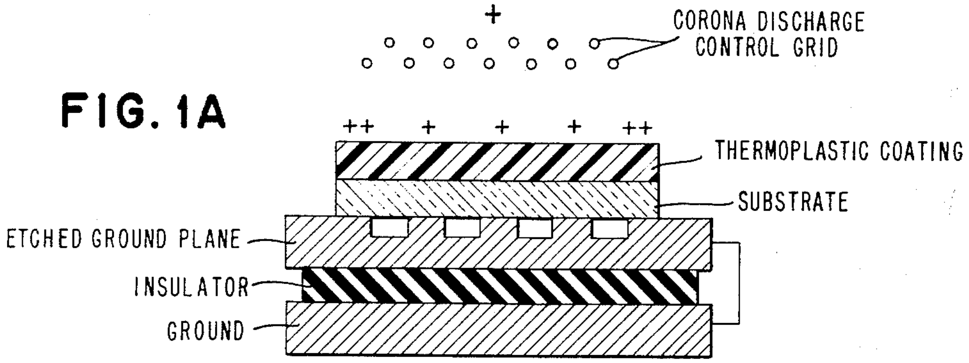
FIGURE 1A depicts the first charging step of the thermoplastic coating by corona discharge.
Figure 1B:
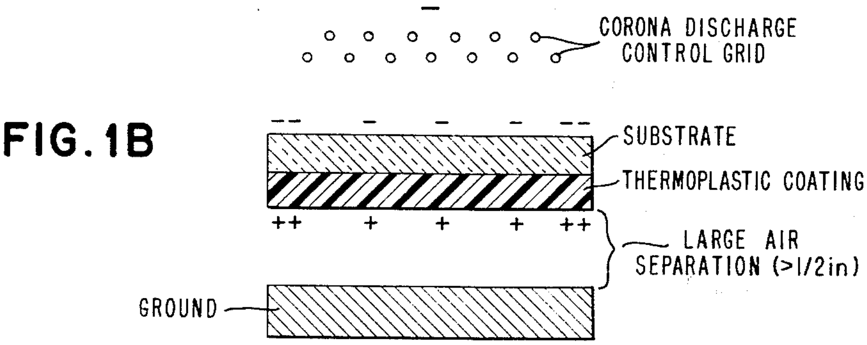
FIGURE 1B depicts the second charging step of the thermoplastic coating in the technique shown in FIGURE 1A.
Figure 1C:
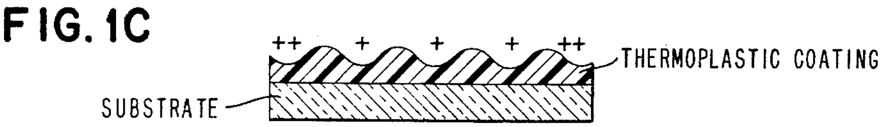
FIGURE 1C depicts the developed thermoplastic image resulting from the charging steps shown in FIGURES 1A and 1B and by subsequented heating and cooling of the charged thermoplastic layer.

A convenient way to place information on thermoplastics is shown in FIGURE 1. The usual mode of operation consisted of placing the composite film (i.e. substrate and thermoplastic coating) with the substrate (e.g. polyethylene terephthalate) on an etched ground plane. Any etched pattern can be used, but the results reported in this invention were obtained with a ground plane having lines etched in it to a density of 250 lines per inch. The control grid of a corona discharge unit was charged positively usually to a voltage of 1200 volts. The composite film was then removed from the ground plane, inverted and suspended so that there was at least ½ inch air separation from ground. In this position, the polyethylene terephthalate side was exposed to the corona discharge. Usually in the second charging step (FIGURE 1B), the same voltage is used as in the first step (FIGURE 1A), however, the corona discharge is set to charge negatively to neutralize the induced charge produced on the substrate side during the first step. The charged composite film was placed then in a special schlieren optical system equipped with a means to expose the thermoplastic material to a hot air pulse which serves to develop the thermoplastic image consisting of hills and valleys as shown in FIGURE 1C. The hot air pulse is adjusted in such a manner that the surface deformations become frozen in the thermoplastic coating. It should be understood that both the time and temperature of hot air pulse can be varied. The hotter the air pulse, the shorter the duration of the pulse. A typical example is the use of air heated to a temperature of 300° C. at an air speed of 25.6 feet per second, and with a series of shutters suitable deformations could be obtained with a pulse lasting 75 milliseconds.

Figure 2:
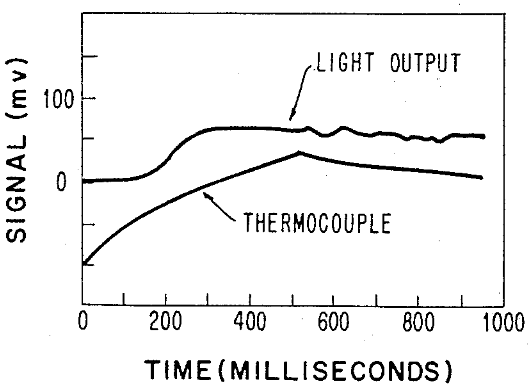
FIGURE 2 is graphic representation of oscilloscope trace of light output during annealing of a charged thermoplastic requiring heat development.
Figure 3:
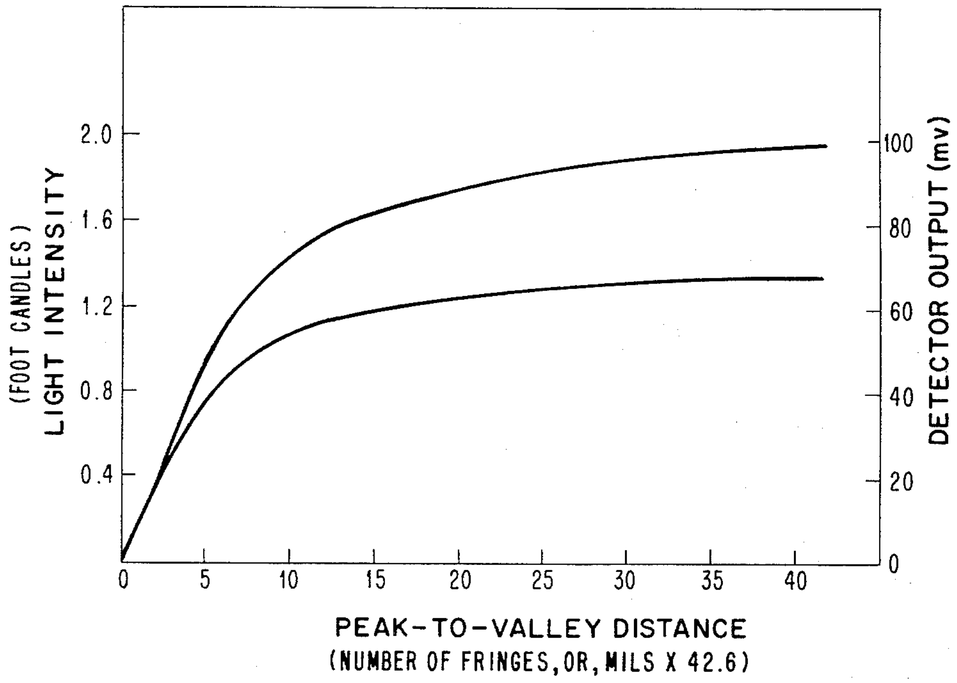
FIGURE 3 is a graphic representation of the schlieren light intensity as a function of the depth of deformation.

Referring to FIGURE 2, the deformation process was followed with the aid of an oscilloscope. Oscilloscope traces were obtained which indicated concomitantly the temperature of the film and the development of a schlieren optical signal. The amplitude of the signal is a measure of the depth of deformation. FIGURE 3 shows curves which correlate the detector output and schlieren light intensity with the depth of deformation. It can be seen from this figure that after a certain depth of deformation is attained, the optical signal becomes saturated so that deeper deformations are not required where optical readout techniques are utilized.

In order that those skilled in the art may better understand how the present invention may be practiced, the following examples are given by way of illustration and not by way of limitation. All parts and percents are by weight unless otherwise noted.

Free radical solution polymerization techniques were used to prepare the polymers. Other polymerization techniques could be used. However, the free radical solution polymerization technique was chosen because it minimized electrical resistivity problems associated with residual polymerization catalysts, specifically $a,a'$-azodi-isobutyronitrile (AIBN) was used as the polymerization catalyst. The usual practice for preparing the polymers is the following: The appropriate monomers were purified by passage through a column of activated alumina. The desired amounts of the purified monomers were added to seven ounce beverage bottles containing an appropriate amount of solvent, usually toluene. The contents of the bottle were purged with prepurified nitrogen for several minutes. Then the bottle was capped and inserted in a polymerization bath. Most of the polymerizations were carried out at 67° C. for a period of 48 hours after which time, the contents of the bottle were added dropwise to cold methanol which was refrigerated with a bath containing Dry Ice and acetone. The precipitated polymer was dried under vacuum conditions, then purified further by dissolving it in toluene and precipitating again in cold methanol. Appropriate benzene solutions of polymer were made to contain approximately 38% solids by weight. Other solvents and solids contents could be used to provide the thermoplastic coating thickness desired, (preferably in the range of 5–40 microns). This solution was then applied to a polyethylene terephthalate substrate. Solvent removal was effected by drying in a nitrogen atmosphere at room temperature followed by complete removal of solvent in a vacuum oven.

*Example 1*

(A) A copolymer of styrene and n-hexyl methacrylate was prepared using monomers from which the inhibitor had been removed by percolation through activated alumina. A solution of 0.08 moles of styrene, 0.02 moles of n-hexyl methacrylate, and 0.8 g. of α,α'-azodi-iso-butyronitrile (AIBN) in 90 ml. of toluene was placed in a seven ounce beverage bottle and freed of entrained oxygen by purging with prepurified $N_2$. After capping, the beverage bottle and contents were placed in a 67° C. polymerization bath for 48 hours. The polymerization was conducted at 67° C. for a period of 48 hours. The polymer thus produced was recovered by adding the polymerization mixture dropwise to refrigerated methanol (−76° C.). The supernatant liquid was decanted and the remaining solvent in the polymer removed by drying in nitrogen at room temperature. Last traces of solvent were removed with the aid of a vacuum oven at room temperature. The polymer was then redissolved in toluene and reprecipitated in the same manner. After reprecipitation, all entrained solvent was removed in the same manner as above. The polymer was then characterized by its number average molecular weight ($M_n$). This measurement was made with a Mechrolab Vapor Pressure Osmometer. Usually one gram of polymer was dissolved in 2.5 ml. of toluene to determine the number average molecular weight by this technique. Using the above polymerization conditions, a styrene-n-hexyl methacrylate copolymer was obtained having a number average molecular weight of 3550.

(B) A solution containing 38% solids of the above copolymer in benzene was prepared. A film was prepared from this solution by coating it on a polyethylene terephthalate film base. The thickness of the dry thermoplastic coating was controlled by the drawing rod used. The excess solvent was removed by drying in a nitrogen atmosphere at room temperature followed by a 1 hour period in a vacuum oven at room temperature. The dry coated substrate was then placed in a oven at 85° C. for 15 minutes to remove any residual stresses.

(C) Referring to FIGURE 1, the annealed and dried coated substrate was placed on an etched stainless steel ground plane. The etched pattern on the ground plane consisted of a grid network of lines with a density of 250 lines per inch. The polyethylene terephthalate side of the composite film was in contact with this ground plane. The corona discharge apparatus was set to charge the thermoplastic composition to 1200 volts. The thus charged composite film was turned over, insulated from ground by a half inch of air and charged oppositely to the same voltage (1200 volts).

The charged composite film was placed in a special schlieren optical system in which it was exposed to a hot air pulse. The deformation pattern developed 160 milliseconds after the beginning of the hot air pulse. The degree of deformation was indicated by an oscilloscope trace deffection of 50 milli-volts generated by a schlieren optical signal.

*Example 2–23*

The process of Example 1 is repeated except that the ingredients, proportions and operating conditions set forth below in Table II were used in the example indicated.

TABLE II.—POLYMERIZATION RECIPE

| Example | 2 | 3 | 4 | 5 | 6 | 7 | 8 | 9 | 10 | 11 |
|---|---|---|---|---|---|---|---|---|---|---|
| Vinyl toluene (moles | | | | | | | | | | |
| Styrene (moles) | 0.1 | 0.08 | 0.08 | 0.08 | 0.08 | 0.088 | 0.088 | 0.069 | 0.067 | 0.060 |
| Methyl methacrylate (moles) | | 0.02 | | | | | | | | |
| Ethyl methacrylate (moles) | | | 0.02 | | | | | | | |
| n-Butyl methacrylate (moles) | | | | 0.02 | | | | | | |
| n-Hexyl methacrylate (moles) | | | | | | 0.022 | | | | |
| Octyl-decyl methacrylate (moles) | | | | | 0.02 | | 0.022 | 0.031 | 0.033 | 0.034 |
| n-Decyl methacrylate (moles) | | | | | | | | | | |
| Stearyl methacrylate (moles) | | | | | | | | | | |
| α, α'-Azodi-iso-butyronitrile(gm.) | 0.8 | 0.8 | 0.8 | 0.8 | 0.8 | 0.88 | 0.88 | 0.8 | 0.8 | 0.8 |
| Toluene (gm.) | 90 | 90 | 90 | 90 | 90 | 99 | 99 | 80 | 80 | 80 |
| Polymerization temperature (° C.) | 67 | 67 | 67 | 67 | 67 | 67 | 67 | 67 | 67 | 67 |
| Polymerization time (hrs.) | 48 | 48 | 48 | 48 | 48 | 48 | 48 | 48 | 48 | 48 |
| Number average molecular weight ($M_n$) | 3,940 | 6,470 | 3,570 | 4,260 | 3,680 | 3,930 | 3,170 | 3,170 | 3,380 | 3,350 |
| Corona charging voltage (volts) | 1,200 | 1,200 | 1,200 | 1,200 | 1,200 | 1,200 | 1,200 | 1,200 | 1,200 | 1,200 |
| Time for deformation to occur (milliseconds)[1] | | | 300 | 180 | 150 | 150 | 150 | 95 | 95 | 80 |
| Schlieren optical signal millivolts)[2] | 0 | 0 | 40 | 35 | 50 | 40 | 40 | 40 | 42 | 40 |

| Example | 12 | 13 | 14 | 15 | 16 | 17 | 18 | 19 | 20 | 21 | 22 | 23 |
|---|---|---|---|---|---|---|---|---|---|---|---|---|
| Vinyl Toluene (moles) | | | | | | | | | | | | 0.08 |
| Styrene (moles) | 0.065 | 0.065 | 0.065 | 0.325 | 0.08 | 0.063 | 0.0649 | 0.0663 | 0.0683 | 0.07 | 0.08 | |
| Methyl methacrylate (moles) | | | | | | | | | | 0.01 | | |
| Ethyl methacrylate (moles) | | | | | | | | | | | | |
| n-Butyl methacrylate (moles) | | | | | | | | | | | 0.01 | |
| n-Hexyl methacrylate (moles) | | | | | | | | | | | | |
| Octyl-decyl methacrylate (moles) | 0.035 | 0.035 | 0.035 | | 0.02 | | | | | 0.02 | | 0.02 |
| n-Decyl methacrylate (moles) | | | | 0.175 | | | | | | | 0.01 | |
| Stearyl methacrylate (moles) | | | | | | 0.0167 | 0.158 | 0.150 | 0.141 | | | |
| α, α'-Azodi-isobutyronitrile (gm.) | 0.8 | 0.3 | 0.1 | 4 | 0.8 | 0.8 | 0.8 | 0.8 | 0.8 | 0.8 | 0.8 | 0.8 |
| Toluene (gm.) | 80 | 80 | 80 | 400 | 80 | 80 | 80 | 80 | 80 | 80 | 80 | 80 |
| Polymerization temperature (° C.) | 67 | 67 | 67 | 67 | 67 | 67 | 67 | 67 | 67 | 67 | 67 | 67 |
| Polymerization time (hours) | 48 | 48 | 48 | 48 | 48 | 48 | 48 | 48 | 48 | 48 | 48 | 48 |
| Number average molecular weight ($M_n$) | 3,990 | 4,930 | 6,510 | 3,490 | 3,070 | 2,710 | 3,880 | 2,570 | 2,670 | 3,560 | 3,440 | 3,350 |
| Test Results | | | | | | | | | | | | |
| Corono charging voltage (volts) | 1,200 | 1,200 | 1,200 | 1,200 | 1,200 | 1,200 | 1,200 | 1,200 | 1,200 | 1,200 | 1,200 | 1,200 |
| Time for deformation to occur (milliseconds)[1] | [3] 0 | 115 | 150 | 150 | 95 | 80 | 150 | 100 | 90 | 100 | 110 | 100 |
| Schlieren optical signal (millivolts) | 50 | 25 | 30 | 48 | 40 | 35 | 20 | 35 | 40 | 39 | 42 | 44 |

[1] The time for deformation to occur is an index of the temperature of the film at that time.

[2] Did not deform.

[3] Deformed at room temperature.

As can be seen from Examples 2 and 3, polystyrene which contains no higher methacrylates, or the copolymer of styrene with methyl methacrylate did not deform on heating after a charge was placed on its surface indicating that the higher methacrylates are to be preferred because of their greater plasticizing action. It will be noted that too high a percentage of the higher methacrylates in the copolymer results in a material which deforms at room temperature upon the application of an electrostatic charge (note Example 12). Examples 12, 13, and 14 illustrate the effect of increasing molecular weight for a given copolymer composition, that is, as the molecular weight increases, the temperature required to produce surface deformations subsequent to charging increases. At the same time, the response of the system becomes sluggish. It is apparent from results in Table II that mixtures of various methacrylates may be used to produce responsive thermoplastic media viz, octyl-decyl-methacrylate and methyl-octyl-decyl methacrylate.

*Example 24*

A. A copolymer of styrene and methyl methacrylate was prepared using monomers from which the initiator had been removed by percolation through activated alumina. A solution of 0.08 mole of styrene, 0.02 mole of methyl methacrylate, and 0.8 gm. of *a,a'*-azodi-iso-butyronitrile (AIBN) in 90 ml. of toluene was placed in a seven ounce beverage bottle and freed from entrained oxygen by purging with prepurified $N_2$. After capping, the beverage bottle and contents were placed in a 67° C. polymerization bath for 48 hours. The polymer thus produced was recovered by adding the polymerization mixture dropwise to refrigerated methanol (—76° C.).

The supernatant liquid was decanted and the remaining solvent in the polymer removed by drying in nitrogen at room temperature. Last traces of solvent were removed with the aid of a vacuum oven at room temperature. The polymer was then redissolved in toluene and reprecipitated in the same manner. After reprecipitation, all entrained solvent was removed in the same manner as above. The polymer was then characterized according to its number average molecular weight ($M_n$). This measurement was made with a Mechrolab Vapor Pressure Osmometer. Usually one gram of polymer was dissolved in 2.5 ml. of toluene to determine the number average molecular weight by this technique. Using the above polymerization conditions, a styrene-methyl methacrylate copolymer was obtained having a number average molecular weight of 6470.

(B) A solution containing 38% solids of the above copolymer and 40 parts of o-terphenyl per hundred parts of polymer in benzene was prepared. A film was prepared from this solution by coating it on a polyethylene terephthalate film base. The thickness of the dry thermoplastic coating was controlled by the drawing rod used. The excess solvent was removed by drying in a nitrogen atmosphere at room temperature followed by a 1-hour period in a vacuum oven at room temperature.

The dry coated substrate was then placed in an 85° C. oven for 15 minutes to remove any residual stresses.

(C) Referring to FIGURE 1, the annealed and dried coated substrate was placed on an etched stainless steel ground plane. The etched pattern on the ground plane consisted of a grid network of lines with a density of 250 lines per inch. The polyethylene terephthalate side of the composite film was in contact with this ground plane. The corona discharge apparatus was set to charge the thermoplastic composition to 1200 volts. The thus charged composite film was turned over, insulated from ground by a half inch of air, and charged oppositely to the same voltage (1200 volts). The charged composite film was placed in a special schlieren optical system in which it was exposed to a hot air pulse. The deformation pattern developed 140 milliseconds after the beginning of the hot air pulse deflection. The degree of deformation was indicated by an oscilloscope trace of 50 millivolts generated by a schlieren optical signal.

*Examples 25–28*

The process of Example 24 is repeated except that the ingredients set forth below in Table II were used in the example indicated.

TABLE III.—POLYMERIZATION RECIPE

| Example | 25 | 26 | 27 | 28 |
|---|---|---|---|---|
| Styrene (moles) | 0.1 | 0.08 | 0.08 | 0.08 |
| Ethyl methacrylate (moles) | | 0.02 | | |
| Hexyl methacrylate (moles) | | | 0.02 | |
| Ocytl-decyl methacrylate (moles) | | | | 0.07 |
| $\alpha\alpha^1$-Azodi-iso-butyronitrile (gm) | 0.8 | 0.8 | 0.8 | 0.2 |
| Toluene (gm.) | 90 | 90 | 90 | 98 |
| Polymerization temperature (° C.) | 67 | 67 | 67 | 60 |
| Polymerization time (hrs.) | 48 | 48 | 48 | 48 |
| Number average molecular weight ($M_n$) | 3,940 | 3,570 | 3,550 | 3,680 |
| **Coating Composition** | | | | |
| Polymer (as indicated above) (gm.) | 100 | 100 | 100 | 100 |
| o-Terphenyl (gm.) | 40 | 40 | 40 | 40 |
| **Test Results** | | | | |
| Corona charging voltage (volts) | 1,200 | 1,200 | 1,200 | 1,200 |
| Time for deformation to occur (milliseconds) [1] | 200 | 150 | RT | [2] RT |
| Schlieren optical signal (millivolts) | 50 | 70 | 40 | 40 |

[1] The time for deformation to occur is an index of the temperature of the film at that time.
[2] Deformed at room temperature.

A perusal of the information in both Tables II and III indicates that compatible plasticizers may be added to these copolymers to lower effectively the temperature deformation and increase the responsiveness of the system (compare Example 24 with Example 3).

*Example 29*

(A) A copolymer of styrene and octyl-decyl methacrylate was prepared using monomers from which the inhibitor had been removed by percolation through activated alumina. A solution of 0.08 mole of styrene, 0.02 mole of octyl-decyl methacrylate, and 0.8 gm. of α,α-azodi-isobutyronitrile (AIBN) in 90 ml. of toluene was placed in a seven ounce beverage bottle and freed from entrained oxygen by purging with prepurified $N_2$. After capping, the beverage bottle and contents were placed in a 67° C. polymerization bath for 48 hours. The polymer thus produced was recovered by adding the polymerization mixture dropwise to refrigerated methanol (—76° C.).

The supernatant liquid was decanted, and the remaining solvent in the polymer removed by drying in nitrogen at room temperature. Last traces of solvent were removed with the air of a vacuum oven at room temperature. The polymer was then redissolved in toluene and reciprocated in the same manner. After reprecipitation all entrained solvent was removed in the same manner as above. The polymer was then characterized according to its number average molecular weight ($\bar{M}_n$. This measurement was made with a Mechrolab Vapor Pressure Osmometer. Usually one gram of polymer was dissolved in 2.5 ml. of toluene to determine the number average molecular weight by this technique. Using the above polymerization conditions, a copolymer of styrene with octyl-decyl-methacrylate was obtained having a number average molecular weight of 3070.

(B) A 38% solution of the above copolymer in benzene was prepared. This solution was applied to a tin oxide coated (electrically conductive) glass slide. The thickness of the thermoplastic coating was adjusted to one mil with a suitable wire wound coating rod. The coated slide was dried in a vacuum oven at about 100° F.

(C) Write-develop-erase cycling of the copolymer of styrene with octyl-decyl methacrylate was carried out in a vacuum. Electrons were accelerated through a 5 kilovolt potential to produce a nominal one mil electron beam as a source of electrostatic charge. A series of lines were written on the thermoplastic to a density of 200 lines/inch. Provisions were made to measure, if desired, the temperature of the film at the onset of development and erasure, the deformation depth with a schlieren optical system, and the charge density required to produce deformations.

FIGURES 4A, B, C depict the sequence of the steps used to get deformations on the surface of the thermoplastic. FIGURE 4A shows the glass substrate on which the thermoplastic is coated. An electrically conductive coating of tin oxide forms a transparent layer between them. FIGURE 4B pictorially shows localized electrostatic charges deposited by the electron beam. A pulse of electricity (circa 300 watts) was sent through the tin oxide coating for approximately 0.7 second to generate heat sufficient to raise the temperature of the thermoplastic to a point where the electrostatic forces were capable of deforming the surface to produce hills and valleys. The intensity and duration of the heat pulse was adjusted to leave the thermoplastic surface in a deformed state after development. These deformations were erased by heating the material to a somewhat higher temperature. This sequence of operations was repeated over and over again to get an estimate of the reversibility of the material.

Using the same operating conditions, the copolymer composed of 80 mole percent styrene and 20 mole percent of octyl-decyl methacrylate withstood 10,000 write-develop-erase cycles without an appreciable change in responsiveness.

*Examples 30–32*

The process of Example 29 is repeated except that the ingredients set forth in Table IV were used in the example indicated.

TABLE IV.—POLYMERIZATION RECIPES

| Examples | 30 [1] | 31 [1] | 32 [2] |
|---|---|---|---|
| Styrene (moles) | 0.08 | 0.08 | 0.07 |
| n-Hexyl methacrylate (moles) | 0.02 | --------- | 0.03 |
| Octyl-decyl methacrylate (moles) | | 0.02 | --------- |
| $\alpha\alpha'$-Azodi-iso-butyronitrile (gm.) | 0.8 | 0.8 | 0.8 |
| Toluene (gm.) | 90 | 90 | 90 |
| Polymerization temperature (° C.) | 67 | 67 | 67 |
| Polymerization time (hrs.) | 48 | 48 | 48 |
| Number average molecular weight ($M_n$) | 3,550 | 3,680 | 3,040 |
| **Test Results** | | | |
| Charge density (coulombs/cm.$^2$) | $1\times10^{-7}$ | $1\times10^{-7}$ | --------- |
| Beam voltage (kilovolts) | 10 | 10 | 5 |
| **Cycles** | | | |
| Optical signal after (millivolts): | | | |
| 100 | 11 | 11 | --------- |
| 500 | 12 | 11 | --------- |
| 1,000 | 11 | 11 | --------- |
| Developing temp. after (° C.): | | | |
| 100 | 50 | 55 | --------- |
| 500 | 50 | 55 | --------- |
| 1,000 | 50 | 55 | --------- |
| Erasure temp. after (° C.): | | | |
| 100 | 140 | 114 | --------- |
| 500 | 140 | 114 | --------- |
| 1,000 | 140 | 114 | --------- |
| Total number of cycles [3] | 1,000 | 1,000 | 2,300 |

[1] Tested with a nominal 5 mil diameter electron beam.
[2] Tested with a nominal 1 mil diameter electron beam.
[3] Tests terminated to make machine modifications.

Table IV lists the results of other typical write-develop-erase cycling experiments. A perusal of the data in Table IV shows the resistance of these materials to radiation and thermal degradation by the constancy of the temperature values at the onset of deformation and at the onset of erasure. A comparison of the data for Examples 28 and 29 shows also that the difference between the develop temperature and the erase temperature decreases as the number of atoms in the methacrylate side chain (R) increases.

Thus, this invention has described copolymers of substituted and unsubstituted styrene with a methacrylate or methacrylates having the formula $$CH_2{=}\overset{\displaystyle CH_3}{\overset{|}{C}}{-}COOR_1$$

(where $R_1$ is selected from the group consisting of an alkyl radical having from 1 to 22 carbon atoms, an arylalkyl radical having from 7 to 22 carbon atoms, and a phenoxyalkyl radical having from 7 to 22 carbon atoms), the methacrylate portion consisting 18–35 mole percent of the total polymer, which copolymer is responsive to electrostatic forces which heated and which exhibits superior reversibility by reason of its resistance to radiation and thermal degradation.

While the invention has been particularly shown and described with reference to preferred embodiments thereof, it will be understood by those skilled in the art that various changes in form and details may be made therein without departing from the spirit and scope of the invention.

What is claimed is:

1. A thermoplastic recording medium comprising (a) a substrate and (b) a layer of a thermoplastic composition comprising a copolymer of from 18–35 mole percent of a methacrylate having the formula $$CH_2{=}\overset{\displaystyle CH_3}{\overset{|}{C}}{-}\overset{\displaystyle O}{\overset{\|}{C}}OR_1$$

where $R_1$ is selected from the group consisting of an alkyl radical having from 1 to 22 carbon atoms, an arylalkyl radical having from 7 to 22 carbon atoms, and a phenoxyalkyl radical having from 7 to 22 carbon atoms with 65–82 mole percent of a styrene having the formula

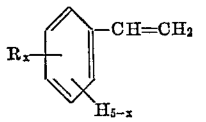

where $R_x$ is selected from the group consisting of hydrogen, methyl and methoxy, and $x$ is a whole number from 0 to 2, said copolymer having a number average molecular weight of about 2500 to 6500.

2. The recording medium of claim 1 wherein the substrate is glass.

3. The recording medium of claim 1 wherein the substrate is a flexible substrate.

4. The recording medium of claim 3 wherein the flexible substrate is a transparent flexible polyethylene terephthalate substrate.

5. The recording medium of claim 1 wherein there is present in the thermoplastic composition from 5 to 100 parts by wight of a compatible plasticizer per hundred parts of copolymer.

6. An optically clear recording medium comprising (a) a substrate, (b) a layer of a thermoplastic composition comprising a copolymer of from 18–35 mole percent of a methacrylate having the formula $$CH_2{=}\overset{\displaystyle CH_3}{\overset{|}{C}}{-}COOR_1$$

where $R_1$ is selected from the group consisting of an alkyl radical having from 1 to 22 carbon atoms, an arylalkyl radical having from 7 to 22 carbon atoms, and a phenoxyalkyl radical having from 7 to 22 carbon atoms and 65–82 mole percent of a styrene having the formula

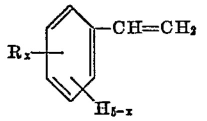

where $R_x$ is selected from the group consisting of hydrogen, methyl and methoxy, and $x$ is a whole number from 0 to 2 said copolymer having a number average molecular weight of about 250 to 6500, and (c) an intermediate transparent conductive layer in contact with both said substrate and said layer of thermoplastic composition.

7. The recording medium of claim 6 wherein said intermediate transparent conducting layer is tin oxide.

8. The recording medium of claim 7 wherein said intermediate transparent conducting layer is chromium.

9. The recording medium of claim 6 wherein there is present in the thermoplastic composition from 5 to 100 parts by weight of a compatible plasticizer per hundred parts of copolymer.

10. The recording medium of claim 6 wherein the substrate is a transparent flexible polyethylene terephthalate substrate.

11. The recording medium of claim 6 wherein the substrate is a transparent flexible polycarbonate resin substrate.

12. A recording medium comprising (a) a substrate; (b) a layer of a thermoplastic composition comprising a copolymer of 80 mole percent styrene and 20 mole percent of octyl-decyl methacrylate said copolymer having a number average molecular weight of about 3070 to 3680, and (c) an intermediate transparent conductive layer in contact with both said substrate and said layer of thermoplastic composition.

13. A recording medium comprising (a) a substrate and (b) thereon a layer of a thermoplastic composition comprising a copolymer of 80 mole percent styrene and 20 mole percent ethyl methacrylate, and 40 parts of o-terphenyl per 100 parts of copolymer, said copolymer having a number average molecular weight of about 3570.

14. A recording medium comprising (a) a substrate and (b) thereon a layer of a thermoplastic composition comprising a copolymer of 80 mole percent styrene and 20 mole percent n-hexyl methacrylate, said copolymer having a number average molecular weight of about 3550 to 3930.

15. A recording medium comprising (a) a substrate and (b) thereon a layer of a thermoplastic composition comprising a copolymer of 70 mole percent styrene, 10 mole percent methyl methacrylate and 20 mole percent octyl-decyl methacrylate, said copolymer having number average molecular weight of about 3560.

16. The recording medium of claim 14 wherein there is interposed an intermediate conductive layer between said substrate and said layer of thermoplastic composition and in contact with both.

17. A recording medium comprising (a) a substrate and (b) thereon a layer of a thermoplastic composition comprising a copolymer of 70 mole percent styrene and 30 mole percent n-hexyl methacrylate, said copolymer having a number molecular weight of about 3550 to 4000.

18. The recording medium of claim 17 wherein there is interposed an intermediate conductive layer between said substrate and said layer of thermoplastic composition and in contact with both.

References Cited

UNITED STATES PATENTS

| | | | |
|---|---|---|---|
| 2,499,526 | 3/1950 | Prichard et al. | 106—191 |
| 2,656,334 | 10/1953 | D'Alelio | 260—47 |
| 2,989,420 | 6/1961 | Zdanowski | 117—132 X |
| 3,118,786 | 1/1964 | Skatchman et al. | 117—211 |
| 3,118,787 | 1/1964 | Katchman | 117—211 |
| 3,317,315 | 5/1967 | Nicoll | 117—218 X |
| 2,985,866 | 5/1961 | Norton | 117—211 |

ALFRED L. LEAVITT, *Primary Examiner.*

C. K. WEIFFENBACH, *Assistant Examiner.*

UNITED STATES PATENT OFFICE

CERTIFICATE OF CORRECTION

Patent No. 3,413,146 November 26, 1968

Herbert R. Anderson, Jr., et al.

It is certified that error appears in the above identified patent and that said Letters Patent are hereby corrected as shown below:

Column 6, line 49, cancel "and radiation resistance", first occurrence. Columns 9 and 10, "Table II.-Polymerization Recipe", Example 11, "0.060" should read -- 0.066 --. Column 12, "Table III.- Polymerization Recipe", line 15, "0.2" should read -- 0.8 --; line 16, "98" should read -- 90 --; line 17, "60" should read -- 67 --. Column 14, line 15, "which" should read -- when --; line 55, "wight" should read -- weight --. Column 15, line 4, "250" should read -- 2500 --.

Signed and sealed this 19th day of May 1970.

(SEAL)

Attest:

Edward M. Fletcher, Jr.
Attesting Officer

WILLIAM E. SCHUYLER, JR.
Commissioner of Patents